(12) United States Patent
Paull et al.

(10) Patent No.: US 8,654,605 B2
(45) Date of Patent: Feb. 18, 2014

(54) COAXIAL SUPPORT STRUCTURE FOR TOWED MARINE SEISMIC SOURCE ARRAYS

(75) Inventors: Wayne Russell Paull, Gulf Breeze, FL (US); Karl Petter Elvestad, Trogstad (NO)

(73) Assignee: PGS Geophysical AS, Lysaker (NO)

( * ) Notice: Subject to any disclaimer, the term of this patent is extended or adjusted under 35 U.S.C. 154(b) by 512 days.

(21) Appl. No.: 12/800,565

(22) Filed: May 18, 2010

(65) Prior Publication Data

US 2011/0286303 A1 Nov. 24, 2011

(51) Int. Cl.
*G01V 1/38* (2006.01)

(52) U.S. Cl.
USPC ............................................. 367/15

(58) Field of Classification Search
USPC .................. 367/15, 16; 248/63, 74.1
See application file for complete search history.

(56) References Cited

U.S. PATENT DOCUMENTS

| | | |
|---|---|---|
| 3,953,826 A | 4/1976 | Brundrit et al. |
| 4,721,180 A | 1/1988 | Haughland et al. |
| 5,469,404 A * | 11/1995 | Barber et al. ................... 367/23 |
| 7,457,193 B2 | 11/2008 | Pramik |
| 7,623,411 B2 * | 11/2009 | Faucheaux et al. ............. 367/16 |
| 2003/0151974 A1 | 8/2003 | Kutty et al. |

FOREIGN PATENT DOCUMENTS

GB 2 433 594 6/2007

OTHER PUBLICATIONS

Steven Jennings, British Search Report, Date of Publication of British Search Report: Nov. 23, 2011.

* cited by examiner

*Primary Examiner* — Mark Hellner (57) ABSTRACT

A seismic source array includes at least one float. A plurality of rigid conduit sections each includes a bracket for suspension from the float at a selected depth in a body of water and configured to suspend a seismic energy source therefrom. At least one bend strain relief is coupled between adjacent rigid conduit sections. Each bend strain relief includes a coupling at each longitudinal end. Each bend strain relief includes woven fiber molded into flexible plastic for transmitting axial loading while absorbing bending and torsional stress. A seismic energy source is suspended from each bracket. Lines for operating the seismic energy sources pass through the rigid conduit sections and the at least one bending strain relief.

9 Claims, 8 Drawing Sheets

COAXIAL SUPPORT STRUCTURE FOR TOWED MARINE SEISMIC SOURCE ARRAYS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of marine seismic surveying. More specifically, the invention relates to support structures for towed marine seismic source arrays.

2. Background Art

Marine seismic surveying is typically performed by towing one or more arrays of seismic energy sources behind a survey vessel. A plurality of seismic sensor cables can also be towed by the survey vessel at laterally spaced apart positions with respect to the center line of the survey vessel.

The source arrays are coupled to the survey vessel by an "umbilical cable" which provides axial strength to tow the source arrays, electrical signal conductors to actuate the individual sources and, when the seismic sources are air guns, compressed air lines to charge the guns between actuations. An array of sources is typically used in order to provide greater seismic signal bandwidth, by selecting individual source having different sizes and thus different energy frequency output.

Figure 1:
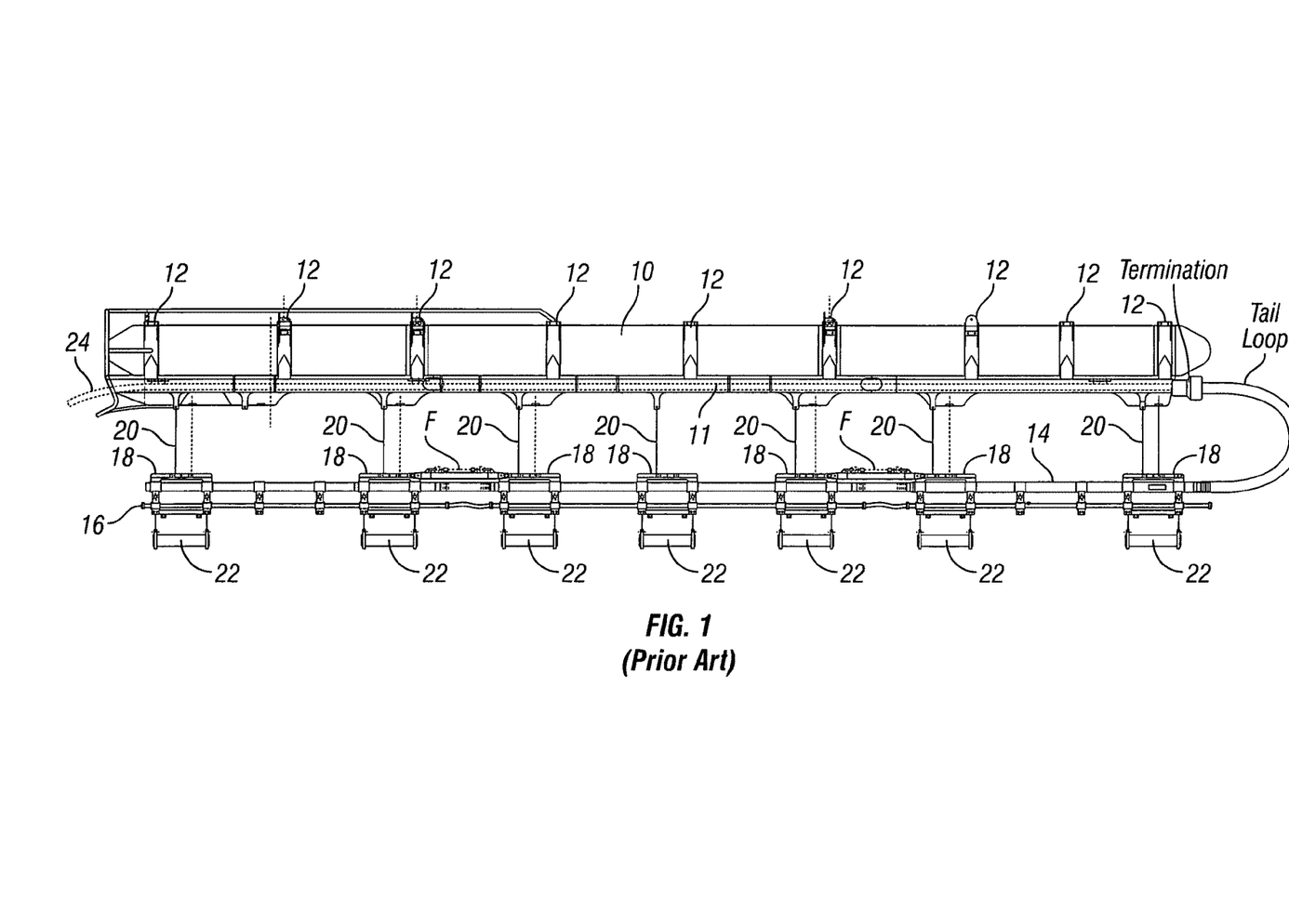
FIG. 1 is an example prior art towed marine seismic source array.

Two different types of source arrays known in the art will be explained to illustrate some of the sources of failure of array support structures known in the art. In FIG. 1, an array structure characterized as a rigid (float) array is shown. A float 10 with an attached keel 11, typically using band clamps 12 or similar device, moves along the surface of the water. The umbilical cable 24 is shown attached to the front and aft of the keel. The aft end of the umbilical cable is terminated in a steel housing with connectors for electric and optical signals, and connector for air pressure. The cables and hoses connected to the termination connectors forms into a tail loop, which then extends forward under the water surface. A harness pipe 14 may be suspended at a selected depth in the water using depth ropes 20. The harness pipe 14 also supports an air manifold 16. The manifold 16 may be suspended from the harness pipe using clamps 18. An air gun 22 is suspended by wires or chains from each clamp 18. The air pressure is fed into the manifold 16 and each air gun 22 is supplied though air outlets welded to the manifold 16. Electrical signals, or other signals, are distributed to and from the air guns 22, and other equipment that may be mounted on the array, through cut-outs in the harness pipe 14.

To absorb some of the flexural motion that inevitably is applied to the gun array, the harness pipe 14 and the manifold 16 include flexural sections F. The flexural sections F include a tow wire to transmit axial loading and a bend restrictor to stiffen/control the flexibility, and the harness pipe 14 and manifold 16 are connected across the flexural sections F using hose or similar flexible conduit. One of the difficulties with the foregoing arrangement is bend fatigue at the connections between the flexural sections F and the adjacent stiff section components, and fatigue in the stiff section components themselves.

Figure 2:
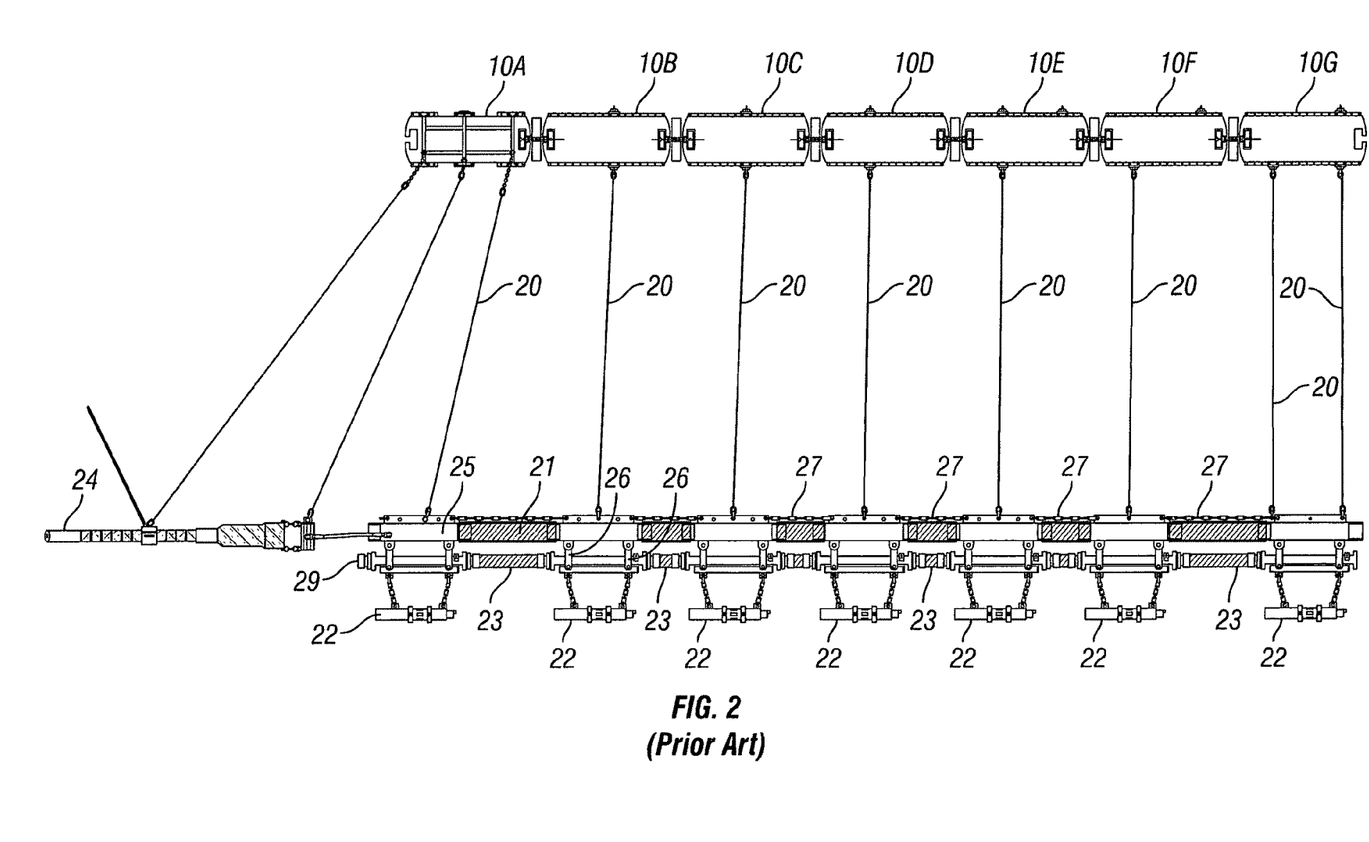
FIG. 2 is another example of a prior art marine seismic source array.

Another source array known in the art is shown in FIG. 2. The array shown in FIG. 2 is typically characterized as a flexible (float) array. The umbilical cable 24 is connected to a forwardmost harness pipe 25. Each harness pipe 25 may be suspended at a selected depth in the water by cables or ropes 20 coupled to associated float segments 10A through 10G. A flexible hose 21 connects the harness pipes 25 to one another. A rigid air manifold 10 is suspended beneath the harness pipe 25 by means of the clamps 26. A flexible hose 23 connects the air manifolds to one another. Air guns 22 may be suspended from the short sections of air manifold using chains or cables. Axial loading is typically transferred across the flexible joints using a tow wire, chain or cable 27. The arrangement in FIG. 2 is also susceptible to bending fatigue and failure. Further, in order to have available both of the array arrangements shown in FIG. 1 and FIG. 2, it is necessary to keep complete inventories of both types of rigid sections ("gun boxes") and flexural members.

There exists a need for improved seismic source array support structures.

SUMMARY OF THE INVENTION

A seismic source array according to one aspect of the invention includes at least one float. A plurality of rigid conduit sections each includes a bracket for suspension from the float at a selected depth in a body of water and configured to suspend a seismic energy source therefrom. At least one bend strain relief is coupled between adjacent rigid conduit sections. Each bend strain relief includes a coupling at each longitudinal end. Each bend strain relief includes woven fiber molded into flexible plastic for transmitting axial loading while absorbing bending and torsional stress. A seismic energy source is suspended from each bracket. Lines for operating the seismic energy sources pass through the rigid conduit sections and the at least one bending strain relief.

In some examples, electrical lines are allowed to pass through the openings in the rigid pipe. Air lines in such examples may be terminated at each section and connected to air distribution blocks to allow air consuming elements, such as air guns, to connect to the air supply. The air distribution blocks are penetrating the rigid pipe and allow the air outlets to be available from inside and outside the rigid pipe.

Other aspects and advantages of the invention will be apparent from the following description and the appended claims.

DETAILED DESCRIPTION

Figure 3:
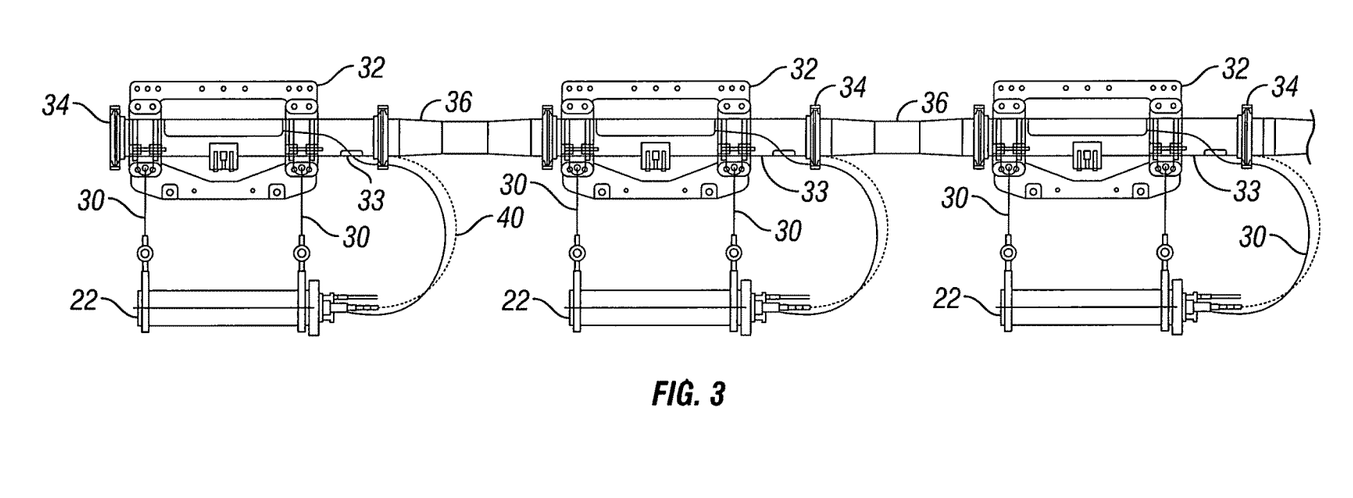
FIG. 3 is an example of a center section of a marine source array having a support structure according to the invention.

An example of a section of a towed marine source array with support structure according to the invention is shown in FIG. 3. The section shown in FIG. 3 includes three rigid sections or "gun boxes" each of which may include a rigid pipe section 33. The rigid pipe section 33 includes a coupling 34 at each end The coupling 34 may be, for example any type of flange, including bolt-through annular rings, or rings that may be coupled to a mating flange using external clamps. Each rigid pipe section 33 includes a bracket 32 coupled to the exterior of the pipe section 33, such as by clamps. The bracket 32 includes openings on an upper part thereof to affix depth ropes and deployment lines (e.g., as shown in FIG. 2). The bracket 32 includes openings on a lower part thereof for cables or chains 30 to suspend a seismic energy source 22 (e.g., air gun) from the bracket 32. The pipe section 33 and affixed bracket 32 will be shown in more detail and described with reference to FIG. 8. The interior of each pipe section 33 forms a conduit for electrical lines and, when air guns are used, compressed air lines to operate the seismic energy sources 22. The pipe section 33 may include an opening for the electrical and air lines (shown at 40) to pass through for connection to the associated seismic energy source. In some examples the air lines may be terminated at each section and connected to air distribution blocks. (See 60 in FIG. 7) The air distribution blocks consist of an inner (60 in FIG. 7) and an outer part (61 in FIG. 7) with a connecting spool piece (63 in FIG. 7) as connection therebetween. Each connecting air line (not shown) can be terminated with a coupling in each end and connected to an inner air block in each end. The feeding air line coming from the umbilical is connected to the first air block in the row. The last air block in the air line has a blank or plug in one end. The inner (60 in FIG. 7) and outer (61 in FIG. 7) air block is assembled with bolts going from the outer block to the inner block. A connecting spool piece (62 in FIG. 7) is equipped with an o-ring in each end as a sealing gasket. The two air block halves bolted together act as a clamp, and the air block assembly is kept in position by the clamping force applied to the rigid pipe section 33. The holes in the rigid pipe section where the bolts and the spool piece are penetrate may be laterally elongated. This gives the air block assembly some room to be able to adapt to slight variations in air line length. The outer air block (61 in FIG. 7) can have a number of ports to connect air guns or other equipment to the air pressure system.

Still with reference to FIG. 3, The rigid pipe sections 33 may be interconnected using a bend strain relief ("BSR") 36. The bend strain relief 36 may be molded from flexible plastic such as polyurethane. A connector 34, such as a mating flange, may be molded into each longitudinal end of the BSR 36 to enable coupling to the mating connector 34 on an adjacent pipe section 33.

The BSR 36 may include molded therein woven fiber or other tension members to enable the BSR 36 to transmit axial loading between pipe sections 33. In one example, The tension members may be arranged as a braided sleeve with the fibers or other tension members laid with a certain angle to provide the desired properties regarding axial stiffness, tension strength and torsional stiffness. The type and amount of fiber or other tension member will also affect the above mentioned strength and stiffness. The mould material type, thickness and physical properties will also affect the above mentioned strength and stiffness. The combination of these three variables will govern the resulting properties of the BSR 36 regarding tensile strength, bend stiffness and torsional stiffness. The BSR 36 provides a conduit for air and electrical lines between the rigid pipe sections 33. The rigid pipe sections 33 may be interconnected using a bend strain relief ("BSR") 36.

Figure 6:
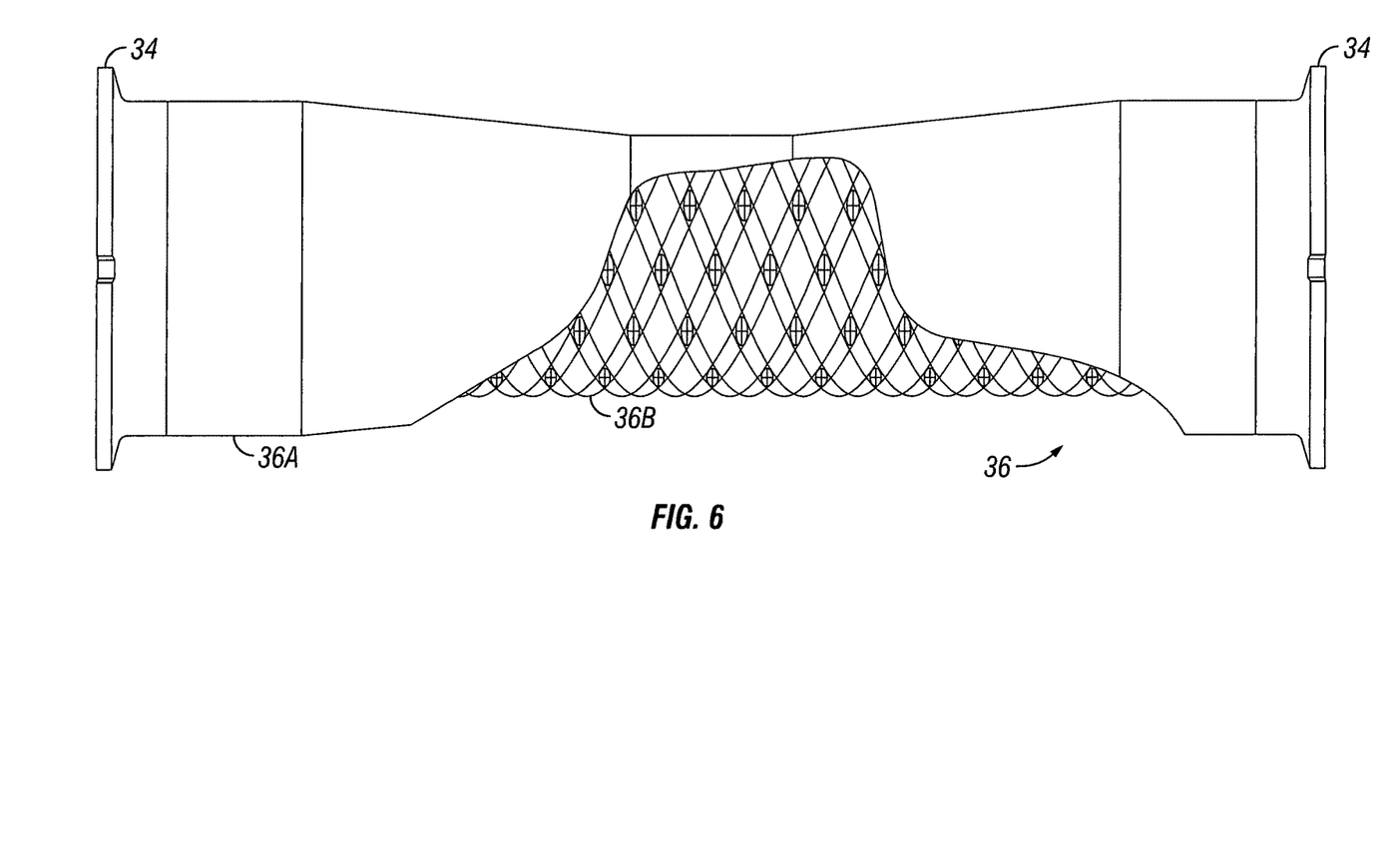
FIG. 6 shows an expanded, cut away view of an example bending strain relief.

Referring to FIG. 6, an example bend strain relief 36 may be molded from flexible plastic 36A such as polyurethane. A connector 34, such as a mating flange, may be molded into the longitudinal ends of the BSR 36 to enable coupling to the mating connector 34 on an adjacent pipe section 33.

Figure 4:
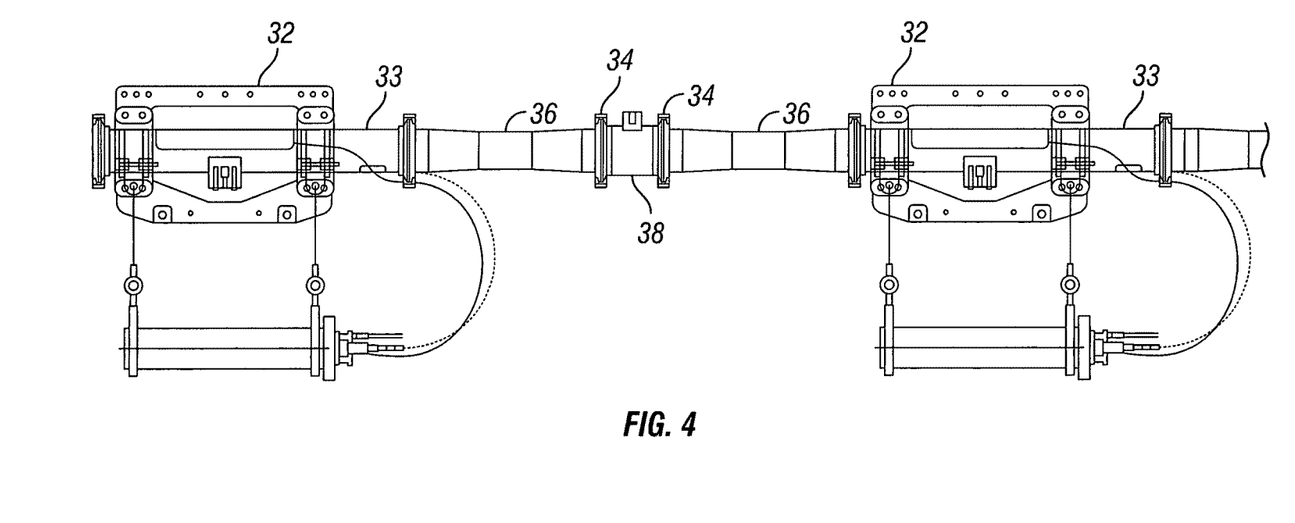
FIG. 4 is an example of an extended section of a marine source array.

Typical marine air gun arrays provide for greater longitudinal spacing between the forwardmost gun and its adjacent gun, and the aftmost gun and its adjacent gun. To provide such spacing, and referring to FIG. 4, two of the rigid pipe sections as explained with reference to FIG. 3 may be coupled using two BSRs 36 substantially as explained above. The BSRs 36 may be coupled end to end using a rigid, e.g., steel spool 39 with corresponding mating flanges on its longitudinal ends.

Figure 5:
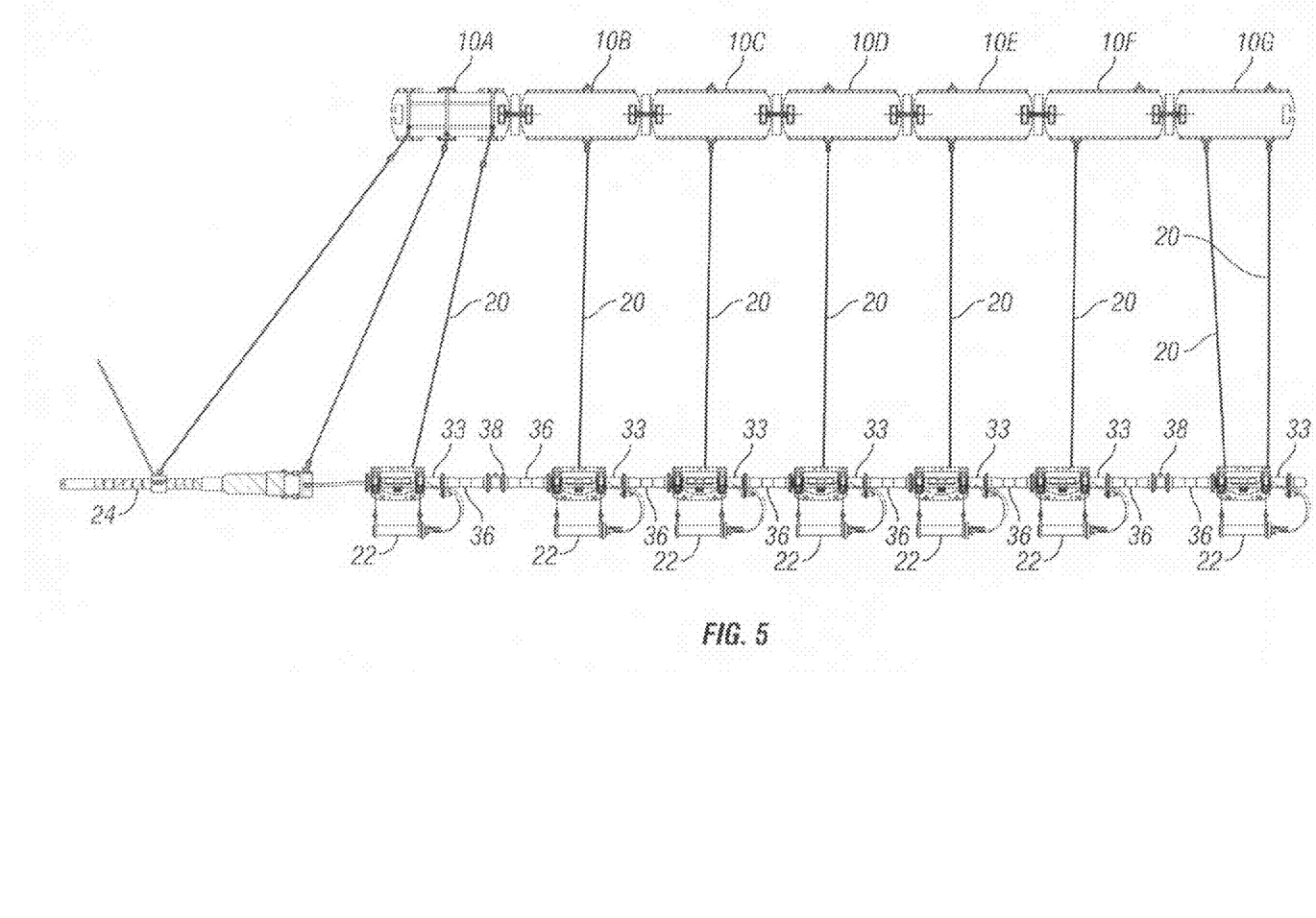
FIG. 5 shows an example of an array having a support structure according to the invention configured as the Gulf of Mexico arrangement shown in FIG. 2.

FIG. 5 shows a seismic source array configured similarly to the array shown in FIG. 2, but using the components explained above with reference to FIGS. 3 and 4. A plurality of gun boxes, including rigid pipe sections 33 are coupled end to end using BSRs 36. A double BSR/spool may be used to connect the forwardmost and aftmost gun boxes to the remainder of the array. Each of the gun boxes may be suspended from a corresponding float 10A-10G using depth ropes and deployment wires substantially as explained with reference to FIG. 2. The umbilical cable 24 may connect to the forwardmost gun box. Thus, all the axial loading, twisting and bending forces are applied along a common axis. The gun boxes and BSRs explained with reference to FIGS. 3 and 4 may also be configured to replace the harness pipe shown in and explained with reference to FIG. 1.

In some examples, each rigid pipe section 33 or mating flanges 34 may include sensors used in typical seismic source arrays, for example, and without limitation, hydrophones, depth (water pressure) transducer, air pressure transducer.

Figure 7:
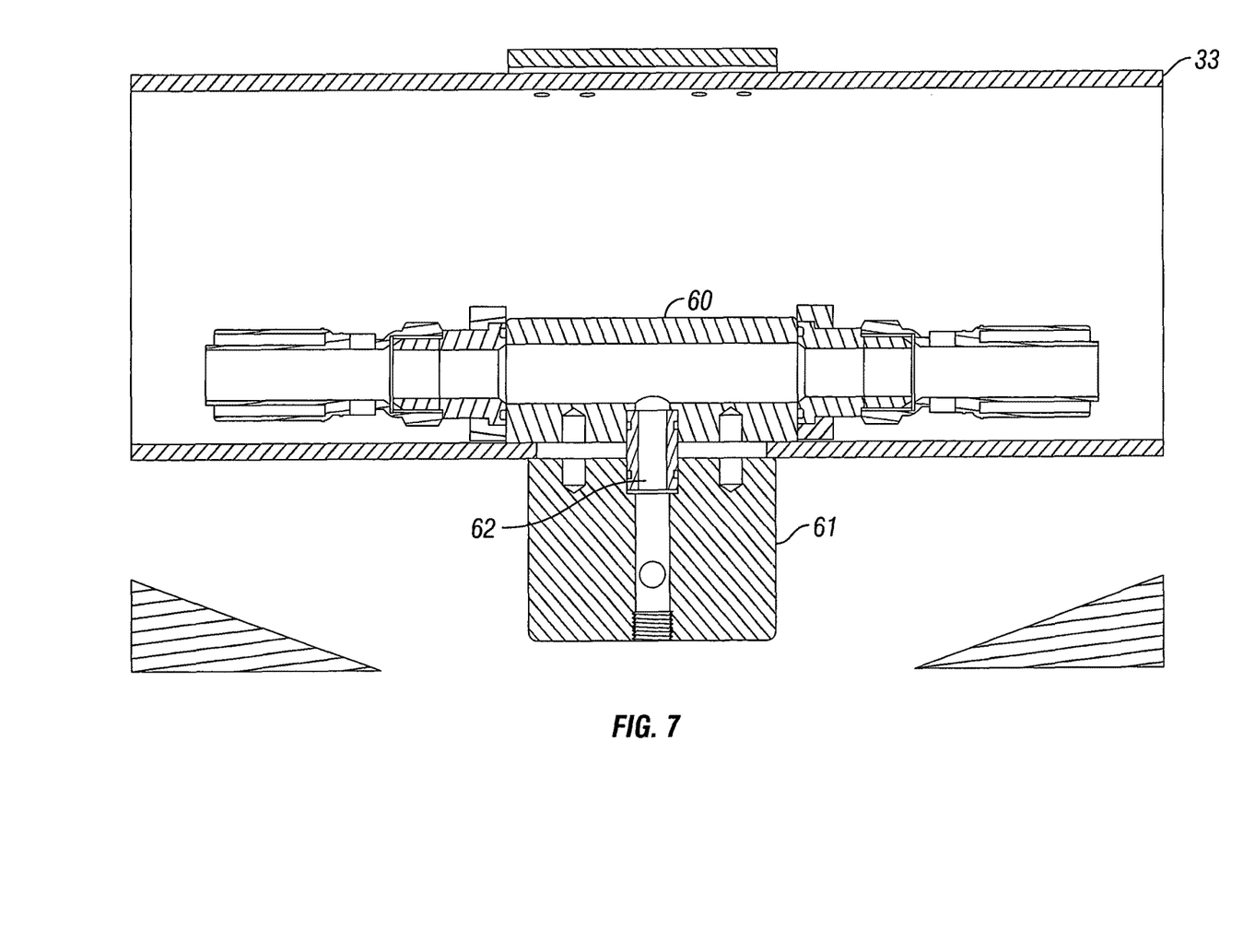
FIG. 7 shows an example of an air block (manifold) coupled to one of the pipe sections.

FIG. 7 shows the air block assembly (including inner block 60, outer block 61 and tube 62 substantially as explained with reference to FIG. 3 but in larger scale to more easily observe the relative components.

Figure 8:
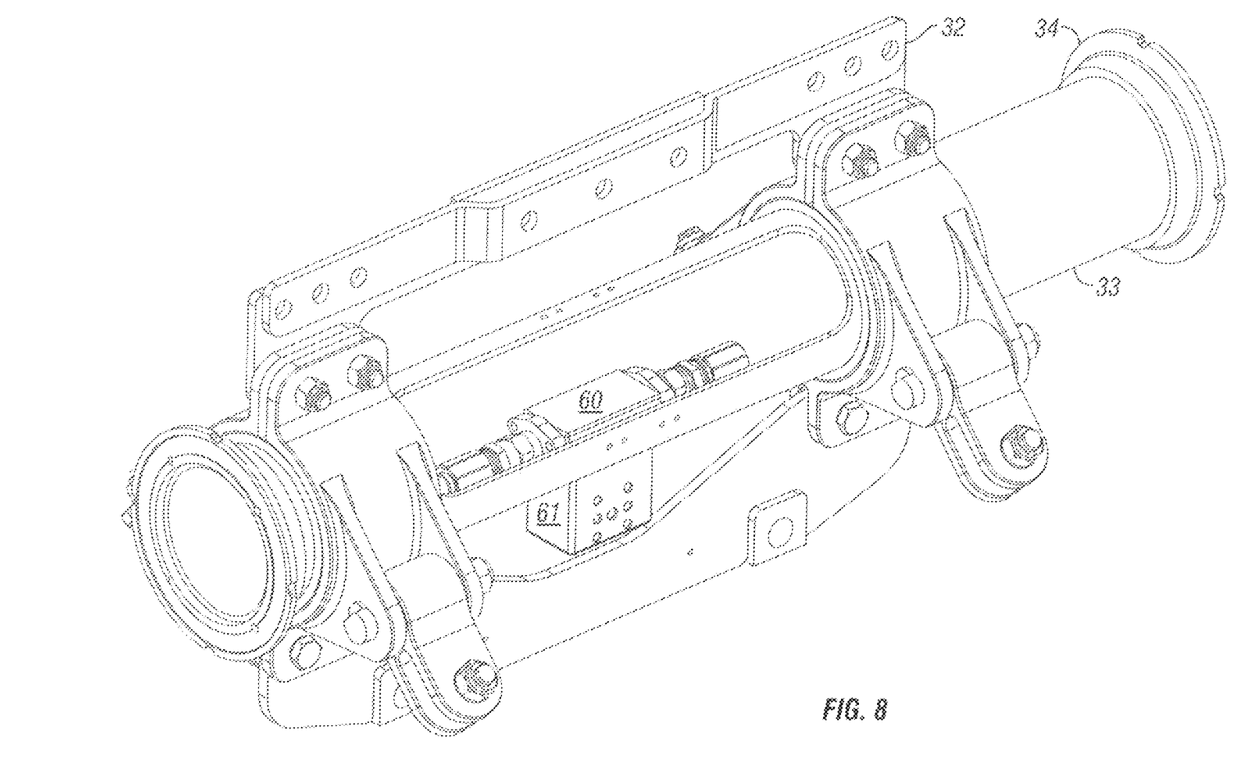
FIG. 8 shows an expanded view of a pipe section with a bracket attached.

An example pipe section 33 with attached bracket 32, and with the air block assembly (FIG. 7) installed as explained with reference to FIG. 3 is shown in FIG. 8 in larger scale, cutaway oblique view so that the relative positions of the various features can be observed.

A seismic source support structure according to the various aspects of the invention may provide increased resistance to bend fatigue failure, and may simplify inventory requirements to marine seismic service providers. It will also increase the lifespan of sensitive elements, such as air hoses and electric/optical lines, by arranging all the elements of the flexural joints nearly co-axial. Bend strain and compression caused by the flexural elements offset from the bending line will be practically eliminated.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A seismic source array, comprising:
   at least one float;
   a plurality of rigid conduit sections, each conduit section including a bracket for suspension from the float at a selected depth in a body of water, the bracket configured to suspend a seismic energy source therefrom;

at least one bend strain relief coupled between adjacent rigid conduit sections, each bend strain relief including a coupling at each longitudinal end, each bend strain relief including woven fiber molded into flexible plastic for transmitting axial loading while absorbing bending and torsional stress; and a seismic energy source suspended from each bracket, wherein lines for operating the seismic energy sources pass through the rigid conduit sections and the at least one bending strain relief.

2. The array of claim 1 wherein longitudinal ends of each of the rigid conduit sections and the at least one bending strain relief include mating flanges.

3. The array of claim 1 wherein at least one of the rigid conduit sections is coupled to an adjacent conduit section using two bending strain reliefs, the bending strain reliefs coupled to each other by a rigid spool.

4. The array of claim 1 wherein each seismic energy source is an air gun.

5. The array of claim 4 wherein the lines comprise compressed air lines and electrical control lines.

6. A seismic source array, comprising:

at least one float;

a plurality of rigid conduit sections, each conduit section including a bracket for suspension from the float at a selected depth in a body of water, the bracket configured to suspend a seismic energy source therefrom;

at least one bend strain relief coupled between adjacent rigid conduit sections, each bend strain relief including a coupling at each longitudinal end, each bend strain relief including woven fiber molded into flexible plastic for transmitting axial loading while absorbing bending and torsional stress;

wherein at least one of the rigid conduit sections is coupled to an adjacent conduit section using two bending strain reliefs, the bending strain reliefs coupled to each other by a rigid spool; and a seismic energy source suspended from each bracket, wherein lines for operating the seismic energy sources pass through the rigid conduit sections and the at least one bending strain relief.

7. The array of claim 6 wherein longitudinal ends of each of the rigid conduit sections and the at least one bending strain relief include mating flanges.

8. The array of claim 6 wherein each seismic energy source is an air gun.

9. The array of claim 8 wherein the lines comprise compressed air lines and electrical control lines.

\* \* \* \* \*